Nov. 5, 1963   R. TYCE   3,110,029
RADIO DIRECTION FINDER
Filed Oct. 19, 1961   3 Sheets-Sheet 1

INVENTOR.
ROLAND TYCE
BY
Wm. H. Dean

Nov. 5, 1963  R. TYCE  3,110,029
RADIO DIRECTION FINDER
Filed Oct. 19, 1961  3 Sheets-Sheet 3
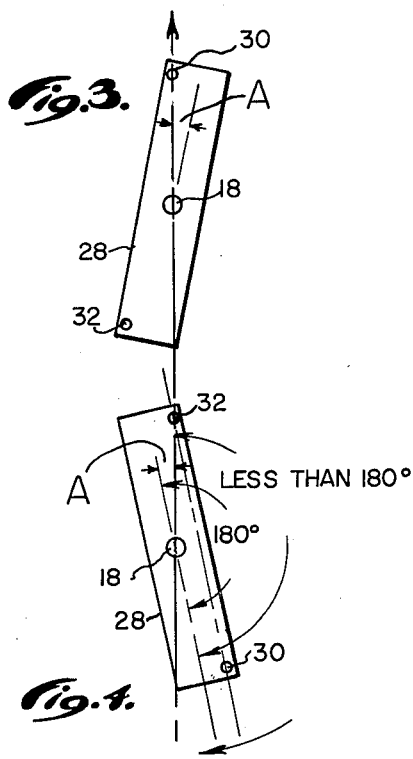
Fig. 3.
Fig. 4.
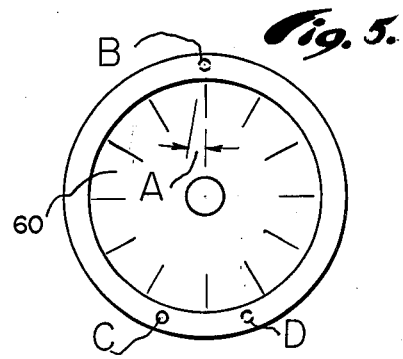
Fig. 5.
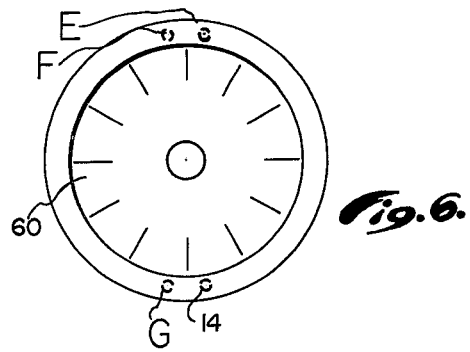
Fig. 6.
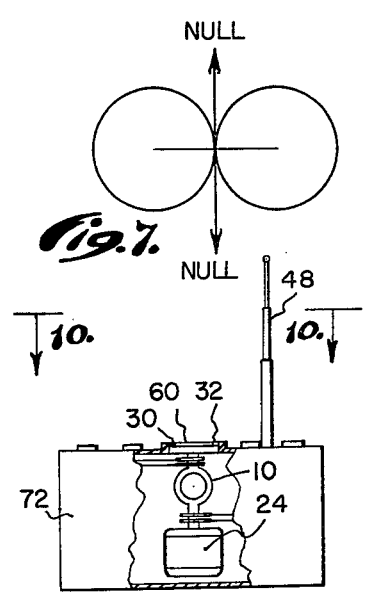
Fig. 7.
Fig. 9.
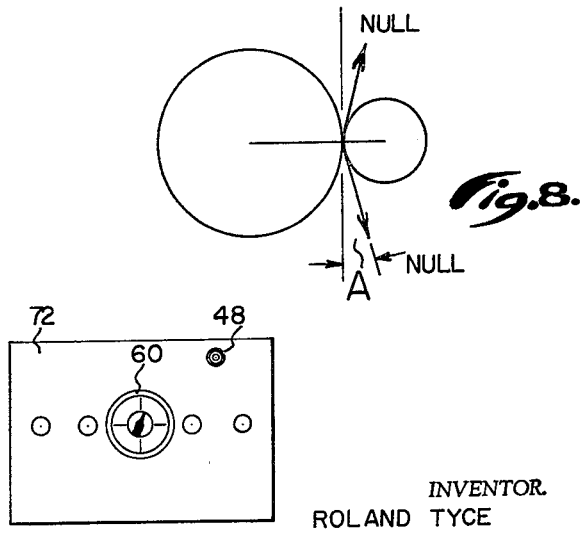
Fig. 8.
Fig. 10.
INVENTOR.
ROLAND TYCE
BY
Wm. H. Dean 3,110,029
RADIO DIRECTION FINDER
Roland Tyce, 410 Carvalos Drive, Chula Vista, Calif.
Filed Oct. 19, 1961, Ser. No. 146,157
8 Claims. (Cl. 343—118)

This invention relates to a radio direction finder and more particularly to a simplified radio direction finder which includes novel means for rotating a conventional loop antenna and a pair of neon lamps to illuminate a compass rose in an arrowhead pattern, whereby an operator of the present radio direction finder may visually detect the direction of a radio station without considering the usual 180 degree ambiguity of conventional loop antenna direction finders.

It has been a problem to provide a simple radio direction finder which is readily usable by the layman and which does not include complicated multiple antenna systems, complicated circuitry and/or complicated mechanical or electronic switching arrangements.

Prior art radio direction finders have been costly and complicated to operate and maintain and have, for these reasons, been unsatisfactory for the layman who needs a simple, economical radio direction finder.

A great need for such a simple radio direction finder has been recognized among small boat owners who utilize their boats for sport fishing and/or small commercial operations.

It has been a problem properly to illuminate a compass rose with a direction pattern thereon, positively and clearly indicating the direction of a radio station.

Accordingly, it is an object of the present invention to provide a radio direction finder having a compass rose means adjacent to which a pair of rotatably mounted illuminating devices are disposed and operable in synchronism with a rotating loop antenna whereby appropriate circuitry coupled to a sense antenna, said loop antenna and said rotating illuminating means, may provide an arrowhead pattern illumination of said compass rose, positively and clearly indicating the direction of a radio station without the usual 180 degree ambiguity of a simple direction finder.

Another object of the invention is to provide a novel compass rose illuminating means operable in combination with a rotating loop antenna and sense antenna, wherein said illuminating means comprising a pair of lamps rotatably mounted about a common axis and each spaced therefrom, said lamps disposed slightly less than 180 degrees apart about said axis and having angular displacement substantially equal to the angular displacements of the nulls of said loop antenna caused by coupling of said sense antenna, thereto, whereby said illuminating means are caused to flash and create an arrowhead pattern of illumination of said compass rose adjacent thereto.

Another object of the invention is to provide a very simple radio direction finder which does not require the use of multiple antennas and complicated mechanical or electronic switching arrangements in order to indicate a true bearing of the direction finder relative to a radio station.

Another object of the invention is to provide a radio direction finder which is very simple, compact, economical and readily operable by a layman.

Another object of the invention is to provide a radio direction finder which may be substantially contained in a small compact enclosure and which is therefore readily portable.

Another object of the invention is to provide a radio direction finder employing a rotating loop antenna coupled to a sense antenna and comprising appropriate circuit means coupled thereto, together with an illuminated compass rose, all of which is contained in a unitary enclosure from which the sense antenna is extendable; said enclosure being of suitable material to permit the transmission of radio waves therethrough and to said rotating loop antenna internally thereof, thereby providing a very compact and self-contained radio direction finder.

Other objects and advantages of the invention may be apparent from the following specification, appended claims and accompanying drawings, in which:

FIG. 3 is a side elevational view of a compass rose illuminating means of the present invention illustrating an angular offset relationship of the neon lamps with respect to a line extending through the rotating axis of the illuminating means and with respect to 180 degrees rotation thereof;

FIG. 4 is a view similar to FIG. 3 showing the compass rose illuminating means of the invention disposed rotationally 180 degrees from that shown in FIG. 3 of the drawings;

FIG. 5 is a side elevational view of a compass rose of the invention showing, by broken lines, an arrowhead illumination pattern thereon, in accordance with the present invention;

FIG. 6 is a side elevational view of a compass rose of the present invention showing an illumination pattern thereon in accordance with operation of the illumination means shown in FIGS. 3 and 4 of the drawings, without a sense antenna coupled to the rotating loop antenna of the invention;

FIG. 7 is a diagrammatic illustration of a conventional lobe-shape and null pattern of a conventional rotating loop antenna;

FIG. 8 is a view similar to FIG. 7 but showing angular displacement and lobe proportions and nulls of a conventional loop antenna having a conventional sense antenna coupled in series therewith;

FIG. 9 is a side elevational view of a portable enclosed radio direction finder of the invention with the sense antenna thereof extended outwardly and upwardly of the enclosure; and FIG. 10 is a top or plan view of the present radio direction finder taken from the line 10—10 of FIG. 9.

Figure 1:
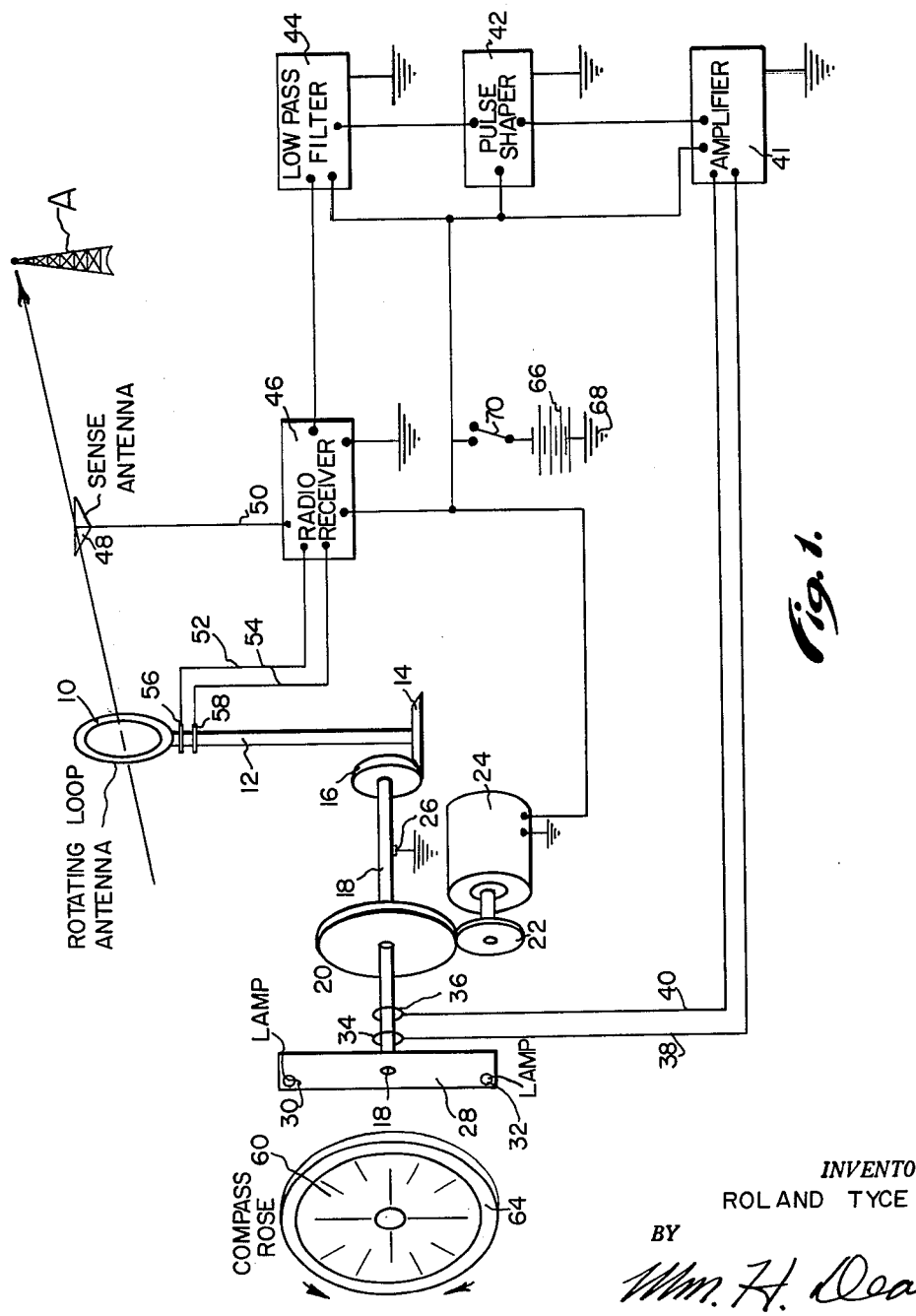
FIG. 1 is a diagrammatic illustration of a radio direction finder, in accordance with the present invention.

As shown in FIG. 1 of the drawings, the radio direction finder of the invention comprises a rotating loop antenna 10 carried by a rotating shaft 12 having a bevel gear 14 fixed thereto. This bevel gear 14 meshes with another bevel gear 16 secured to a rotating shaft 18 carrying a spur gear 20 which meshes with another spur gear 22 driven by a motor 24. The shaft 18 is provided with a suitable electrical ground 26 and extends beyond the gear 20 and carries a bar 28 on which a pair of lamps 30 and 32 are mounted.

These lamps are electrically coupled through the ground 26 and through respective slip-rings 34 and 36 coupled in the conventional manner to conductors 38 and 40 which communicate with an amplifier 41. The amplifier 41 is in circuit with a pulse shaper 42, low pass filter 44 and a receiver 46 to which are coupled the rotating loop antenna 10 and the sense antenna 48.

This sense antenna 48 is a simple non-directional antenna which is coupled in series with the rotating loop antenna 10 in a conventional manner, as will be hereinafter described. The sense antenna 48 is coupled through a conductor 50 with the radio receiver 46 and in series with the loop antenna 10 which is provided with a pair of conductors 52 and 54 coupled by slip-rings 56 and 58, respectively, to the loop antenna 10. The conductors 52 and 54 are coupled to the radio receiver 46.

The loop antenna 10 is directional as to the bearing angle of a radio wave from a station A, as shown in FIG. 1 of the drawings, but loop antennas usually are uncertain in their indication as to the actual direction of a transmitting station. This uncertainty of direction is a 180 degree uncertainty due to the fact that the nulls of such a loop antenna are 180 degrees apart.

The sense of the bearing relative to the radio station A is determined by inducing, in series with the loop antenna, a small voltage derived from the non-directional sense antenna 48, but 90 degrees out of phase with the voltage that the passing wave induces in the sense antenna 48. The resulting directional pattern of the combined loop and sense antennas for various amounts of antenna effect, is disclosed in FIG. 8 of the drawings. It will be understood that when the antenna effect is not too great, one lobe of the loop pattern is enlarged and the other is reduced. This action is caused due to the fact that the equivalent voltage acting around the loop, and representing the loop pick-up, is approximately 90 degrees out of phase with the voltage induced in the wires of the loop and has a polarity that depends upon the direction of arrival of the radio waves. Hence, when the non-directional energy pick-up of the sense antenna is used to induce a voltage in the loop circuit with a 90 degree phase shift, this voltage will add to or subtract from the loop pick-up according to the direction from which the waves arrive.

The sense arrangement of the antenna 48 is a substantially typical one in a directional finding system. This system employs the sense antenna 48, located in close proximity to the loop, and may be provided with a high series resistance to make the antenna current substantially in phase with the voltage induced by the passing wave. This antenna circuit may be raised so that it can be inductively coupled to the loop. The voltage induced in the loop from the sense antenna 48 may be 90 degrees out of phase with the current and hence the voltage produced in the sense antenna by the passing wave. The series resistance coupled to the antenna and the coupling between the loop and sense antennas are adjusted so that the antenna effect is less than the loop pick-up, but at the same time is sufficient to produce a noticeable effect on the directional pattern of the loop.

In conventional practice, the procedure for determining the direction of arrival of radio waves with an antenna system, according to the invention, is as follows:

The bearing is first obtained by adjusting the loop for minimum response with the sense antenna 48 disconnected. The loop antenna 10 is then rotated 90 degrees and the sense antenna connected to one end of its coupling coil by means of a push button or similar equipment. The addition of the sense antenna will then cause the receiver output to decrease or increase according to the sense of the bearing. By checking the system against a wave of known sense at the time of installation and thereafter always making the 90 degree rotation of the loop in the same direction, all uncertainty as to the sense of the bearing is removed.

The radio direction finder of the present invention is set up so that the motor 24 will always cause rotation of the loop in the same direction after the proper sense of direction of the unit has been initially established.

As shown in FIGS. 1, 3, and 4 of the drawings, the lamps 30 and 32 are off-set relative to the axis of the shaft 18 in an amount equal to the angular displacement of direction of the nulls of the loop antenna 10 which is caused by series coupling with the sense antenna 48, as illustrated in FIG. 8 of the drawings. As indicated by the reference character A in FIGS. 3, 4 and 8 of the drawings, the angular displacement of the lamps 30 and 32 relative to the axis of the shaft 18 equals the angular displacement A of the direction of the nulls of the rotating loop antenna caused by series coupling with the sense antenna 48.

It will be seen that the lamps 30 and 32 as shown in FIG. 4 of the drawings, are displaced substantially less than 180 degrees apart about the axis of the shaft 18 which coincides with the angular displacement A of the nulls of the loop antenna in series with the sense antenna 48, as shown in FIG. 8 of the drawings.

It will be seen that the included angle of the arrowhead illumination pattern is equal to twice the angle A, as shown in FIGS. 3, 4, 5 and 8.

The bar 28 carries the lamps 30 and 32 adjacent a compass rose 60, as shown best in FIGS. 1 and 9 of the drawings. This compass rose 60 is provided with a transparent or translucent peripheral portion 64, adjacent the lamps 30 and 32 whereby a light pattern is projected through the portion 64 in an arrowhead form by the lamps 30 and 32, as will be hereinafter described in detail.

The apparatus shown in FIG. 1 of the drawings, comprises a battery 66 having a ground 68 and a switch 70 coupled to its opposite terminal which may be manually operable to initiate operation of the electronic equipment and of the motor 24 of the invention.

The battery 66 has sufficient capacity to operate the motor 24 and the apparatus including the radio receiver 46, low pass filter 44, pulse shaper 42 and the amplifier 41, which are preferably provided with semiconductor circuitry to minimize the power requirements and provide for a very compact apparatus.

This apparatus is enclosed in a suitable housing as shown in FIGS. 9 and 10 of the drawings. This housing 72 is preferably made of plastic or any other suitable material which does not interrupt radio waves. The loop antenna 10, the battery 66 and all of the components of the radio direction finder of the present invention are enclosed in the housing 72 which is readily portable. The antenna 48 is retractable into the housing 72 and the entire radio direction finder of the invention may be placed on board a small ship or boat without any alteration thereof or special connection therewith.

Figure 2:
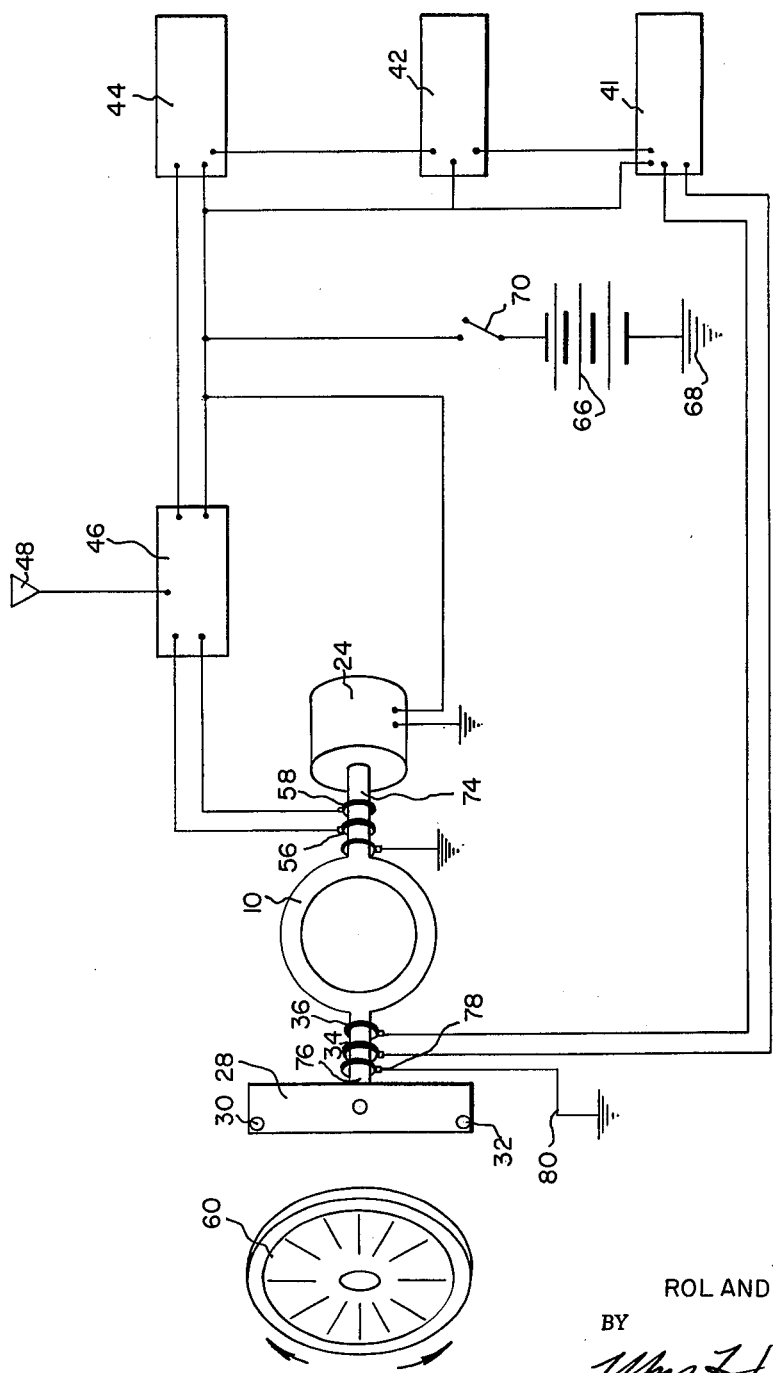
FIG. 2 is a view similar to FIG. 1 but showing a modified form of the radio direction finder of the present invention.

As shown in FIGS. 2 and 9 of the drawings, the rotating loop antenna 10 is coupled directly to an output shaft 74 of the motor 24 and the bar 28 is provided with a shaft portion 76 which is coupled to the loop antenna 10 in axial alignment with the motor shaft 74. Thus, the motor shaft 74, the rotating loop antenna 10 and the bar 28 all operate on a common axis.

It will be obvious to those skilled in the art that various mechanical connections may be made between the motor 24, loop antenna 10 and the bar 28.

The direct connection of the bar 28 in alignment with the loop antenna 10 and the axis of the motor shaft 74 provides for a very compact structure, as shown in FIG. 9 of the drawings, which does not include the various gears, as shown in FIG. 1 of the drawings.

The bar 28, as shown in FIG. 2 of the drawings, operates closely adjacent the compass rose 60, as hereinbefore described in connection with the FIGS. 1 and 9 of the drawings.

As shown in FIG. 2 of the drawings, a slip-ring 78 in connection with a conductor 80 provides a ground connection for the lamps 30 and 32 while the slip-rings 34 and 36 are similer to those shown in FIG. 1 of the drawings.

In operation, the switch 70 is closed which energizes the motor 24 and the electronic circuitry in connection with the antennas 10 and 48. As the motor 24 rotates the loop antenna 10, it also concurrently and in synchronism therewith rotates the bar 28 carrying the lamps 30 and 32 which are preferably neon-type lamps. As the rotating loop antenna 10 operates and rotates in synchronism with the rotation of the bar 28, the lamps 30 and 32 illuminate the compass rose in an arrowhead pattern, as shown in FIG. 5 of the drawings.

The sense antenna 48, in combination with the loop antenna 10, cooperate to cause angular displacement of the loop nulls as hereinbefore described.

As the loop antenna 10 rotates in the field of a signal from a radio station A, the signal is amplified, detected and passed through a filter. The remaining low frequency A.-C. signal is the result of the antenna rotating through two null positions for each revolution. This A.-C. signal is shaped into sharp spikes and amplified by suitable electronic circuitry to fire the lamps 30 and 32 carried on the rotating bar 28. The slip-rings 34 and 36 serving to transmit the energy to fire the lamps. The bar 28 rotates at the same speed as the antenna 10 and as hereinbefore described, the lamps are angularly displaced on the bar in a relationship equal to the angular displacement of the nulls of a rotating loop antenna when operated in series with the sense antenna, as shown in FIGS. 3, 4 and 8 of drawings.

Reference is now made to FIG. 5 of the drawings, which illustrates the arrowhead pattern of illumination of the neon lamps when fired. Illumination at B on the compass rose is the point of the arrowhead shape of illumination while illumination point C and D form the broad end of the arrowhead illumination pattern.

It will be seen that both neon lamps 30 and 32 fire corresponding to each null of the rotating loop antenna, and the lamps are rotated about the axis of the shaft 18 substantially 180 degrees to fire each time, all of which is graphically disclosed in FIG. 4 of the drawings and in FIG. 8 of the drawings. It will be seen that the lamps 30 and 32, as shown in FIG. 3 of the drawings, fire in the position shown to provide illumination at the points B and C in FIG. 5 of the drawings, and that when the bar rotates 180 degrees further to the position shown in FIG. 4 of the drawings, the lamps 30 and 32 fire at an opposite null of the rotating loop antenna to provide illumination at the points B and D.

With the speed of rotation of the shaft 18, the successive firing of the lamps 30 and 32 in the positions of FIGS. 3 and 4, respectively, causes the arrowhead pattern B, C and D, as shown in FIG. 5 to appear as a single pattern since the speed of rotation causes the illumination of these light patterns very close together from a time standpoint.

FIG. 7 discloses the nulls of a conventional rotating loop antenna exactly 180 degrees apart and FIG. 6 discloses a possible illumination of the compass rose in a rectangular pattern in areas E, F, G and H, as would be the case utilizing only the rotating loop antenna 10 without a series connection of the non-directional sense antenna 48.

Thus, according to the invention, the angular displacement of the nulls equal the angle A in FIG. 8 of the drawings, caused by series connection of the sense antenna with the rotating loop antenna, provides for successive firing of the lamps 30 and 32 in positions successively, as shown in FIGS. 3 and 4 of the drawings. While the lamps are fired each time, the loop antenna and shaft 18 rotate 180 degrees, the angular displacement of the lamps corresponding to the angular displacement of the nulls of the rotating loop antenna and provide for the arrowhead illuminating pattern of the compass rose 60.

It will be obvious to those skilled in the art that a layman who may utilize the radio direction finder of the present invention will obviously recognize the direction of the broadcasting station A when viewing the horizontally disposed compass rose 60 having displayed thereon, the arrowhead pattern of light at the points B, C and D and that such a person may need only to point the bow of his boat or direct his vehicle in the direction of the arrowhead light pattern to proceed toward the station A or may take an angular bearing relative thereto in order to reach a desired designation.

It will be obvious to those skilled in the art that various modifications of the present invention may be resorted to in a manner limited only by a just interpretation of the following claims.

I claim:

1. A rotating loop antenna; a sense antenna coupled thereto to create angular displacement of the nulls of the loop antenna with respect to a normal 180 degree disposition thereof; first means rotatable about a stationary axis; an illuminating means carried by said first means and angularly displaced relative to said stationary axis, in correspondence with the angular displacement of said nulls of said loop antenna; a compass rose adjacent said illuminating means carried by said first means whereby a pattern of light may be displayed on said compass rose in an arrowhead pattern; second means coupled to said rotating loop antenna and said sense antenna for energizing said illuminating means each 180 degrees of rotation of said first means whereby successive energization of said illuminating means on said first means from a first 180 degree position to a second 180 degree position causes illumination of said compass rose in an arrowhead pattern wherein the included angle of the arrowhead pattern is equal to twice the said angular displacement of each null of said rotating loop antenna caused by energization of said non-directional sense antenna.

2. A rotating loop antenna; a sense antenna coupled thereto to create angular displacement of the nulls of the loop antenna with respect to a normal 180 degree disposition thereof; first means rotatable about a stationary axis; an illuminating means carried by said first means and angularly displaced relative to said stationary axis in correspondence with the angular displacement of said nulls of said loop antenna; a compass rose adjacent said illuminating means carried by said first means whereby a pattern of light may be displayed on said compass rose in an arrowhead pattern; second means coupled to said rotating loop antenna and said sense antenna for energizing said illuminating means each 180 degrees of rotation of said first means whereby successive energization of said illuminating means on said first means from a first 180 degree position to a second 180 degree position causes illumination of said compass rose in an arrowhead pattern wherein the included angle of the arrowhead pattern is equal to twice the said angular displacement of each null of said rotating loop antenna caused by energization of said non-directional sense antenna; said loop antenna and said first means rotatably on a common axis at the same speed and in synchronism with each other.

3. A rotating loop antenna; a sense antenna coupled thereto to create angular displacement of the nulls of the loop antenna with respect to a normal 180 degree disposition thereof; first means rotatable about a stationary axis; an illuminating means carried by said first means and angularly displaced relative to said stationary axis in correspondence with the angular displacement of said nulls of said loop antenna; a compass rose adjacent said illuminating means carried by said first means whereby a pattern of light may be displayed on said compass rose in an arrowhead pattern; second means coupled to said rotating loop antenna and said sense antenna for energizing said illuminating means each 180 degrees of rotation of said first means whereby successive energization of said illuminating means on said first means from a first 180 degree position to a second 180 degree position causes illumination of said compass rose in an arrowhead pattern wherein the included angle of the arrowhead pattern is equal to twice the said angular displacement of each null of said rotating loop antenna caused by energization of said non-directional sense antenna; said loop antenna and said first means rotatable on a common axis at the same speed and in synchronism with each other; said compass rose having means to transmit light from said illuminating means; said illuminating means being disposed at the rearward side of said compass rose for illuminating the same.

4. A rotating loop antenna; a non-directional sense antenna coupled thereto to create angular displacement of the nulls of the loop antenna with respect to a normal 180 degree disposition thereof; first means rotatable about a stationary axis; an illuminating means carried by said first means and angularly displaced relative to said stationary axis in correspondence with the angular displacement of said nulls of said loop antenna; a compass rose adjacent said illuminating means carried by said first means whereby a pattern of light may be displayed on said compass rose in an arrowhead pattern; second means coupled to said rotating loop antenna and said sense antenna for energizing said illuminating means each 180 degrees of rotation of said first means whereby successive energization of said illuminating means on said first means from a first 180 degree position to a second 180 degree position causes illumination of said compass rose in an arrowhead pattern wherein the included angle of the arrowhead pattern is equal to twice the said angular displacement of each null of said rotating loop antenna caused by energization of said non-directional sense antenna; said second means comprising a radio receiver, a low pass filter, pulse shaper and amplifier electronically coupled to said rotating loop antenna, said non-directional sense antenna and said illuminating means; a motor for driving said loop antenna and said first means; and a battery for energizing said motor, said radio receiver, low pass filter, said pulse shaper and said amplifier.

5. A rotating loop antenna; a non-directional sense antenna coupled thereto to create angular displacement of the nulls of the loop antenna with respect to 180 degree disposition thereof; first means rotatable about a stationary axis; an illuminating means carried by said first means and angularly displaced relative to said stationary axis in correspondence with the angular displacement of said nulls of said loop antenna; a compass rose adjacent said illuminating means carried by said first means whereby a pattern of light may be displayed on said compass rose in an arrowhead pattern; second means coupled to said rotating loop antenna and said sense antenna for energizing said illuminating means each 180 degrees of rotation of said first means whereby successive energization of said illuminating means on said first means from a first 180 degree position to a second 180 degree position causes illumination of said compass rose in an arrowhead pattern wherein the included angle of the arrowhead pattern is equal to twice the said angular displacement of each null of said rotating loop antenna caused by energization of said non-directional sense antenna; said second means comprising a radio receiver, a low pass filter, pulse shaper, and amplifier electronically coupled to said rotating loop antenna, said non-directional sense antenna and said illuminating means; a motor for driving said loop antenna and said first means; and a battery for energizing said motor, said radio receiver, low pass filter, pulse shaper and amplifier; a housing which is made of material to pass radio waves; said loop antenna, said motor, said first means, said radio receiver, low pass filter, pulse shaper, amplifier and said battery all contained in said housing; said compass rose disposed on the upper horizontal surface of said housing and open to view at the upper side thereof; said motor, said loop antenna, and said first means all disposed on a substantially vertical axis.

6. A rotating loop antenna; a non-directional sense antenna coupled thereto to create angular displacement of the nulls of the loop antenna with respect to 180 degree disposition thereof; first means rotatable about a stationary axis; an illuminating means carried by said first means and angularly displaced relative to said stationary axis in correspondence with the angular displacement of said nulls of said loop antenna; a compass rose adjacent said illuminating means carried by said first means whereby a pattern of light may be displayed on said compass rose in an arrowhead pattern; second means coupled to said rotating loop antenna and said sense antenna for energizing said illuminating means each 180 degrees of rotation of said first means whereby successive energization of said illuminating means on said first means from a first 180 degree position to a second 180 degree position causes illumination of said compass rose in an arrowhead pattern wherein the included angle of the arrowhead pattern is equal to twice the said angular displacement of each null of said rotating loop antenna caused by energization of said non-directional sense antenna; said second means comprising a radio receiver, a low pass filter, pulse shaper, and amplifier electronically coupled to said rotating loop antenna, said non-directional sense antenna and said illuminating means; a motor for driving said loop antenna and said first means; and a battery for energizing said motor, said radio receiver, low pass filter, pulse shaper and amplifier; a housing which is made of material to pass radio waves; said loop antenna, said motor, said first means, said radio receiver, low pass filter, pulse shaper, amplifier and said battery all contained in said housing; said compass rose disposed on the upper horizontal surface of said housing and open to view at the upper side thereof; said motor, said loop antenna, and said first means all disposed on substantially vertical axis; said sense antenna telescopically extendable at the upper side of said housing.

7. A rotating loop antenna; a sense antenna coupled thereto to create angular displacement of the nulls of the loop antenna with respect to a normal 180 degree disposition thereof; first means rotatable about a stationary axis; an illuminating means carried by said first means and angularly displaced relative to said stationary axis in correspondence with the angular displacement of said nulls of said loop antenna; a compass rose adjacent said illuminating means carried by said first means whereby a pattern of light may be displayed on said compass rose in an arrowhead pattern; second means coupled to said rotating loop antenna and said sense antenna for energizing said illuminating means each 180 degrees of rotation of said first means whereby successive energization of said illuminating means on said first means from a first 180 degree position to a second 180 degree position causes illumination of said compass rose in an arrowhead pattern wherein the included angle of the arrowhead pattern is equal to twice the said angular displacement of each null of said rotating loop antenna caused by energization of said non-directional sense antenna; a radio wave transmitting housing containing said loop antenna, said motor, said first means and said second means; said compass rose mounted at the top of said housing and disposed in a substantially horizontal plane.

8. A rotating loop antenna; a sense antenna coupled thereto to create angular displacement of the nulls of the loop antenna with respect to a normal 180 degree disposition thereof; first means rotatable about a stationary axis; an illuminating means carried by said first means and angularly displaced relative to said stationary axis in correspondence with the angular displacement of said nulls of said loop antenna; a compass rose adjacent said illuminating means carried by said first means whereby a pattern of light may be displayed on said compass rose in an arrowhead pattern; second means coupled to said rotating loop antenna and said sense antenna for energizing said illuminating means each 180 degrees of rotation of said first means whereby successive energization of said illuminating means on said first means from a first 180 degree position to a second 180 degree position causes illumination of said compass rose in an arrowhead pattern wherein the included angle of the arrowhead pattern is equal to twice the said angular displacement of each null of said rotating loop antenna caused by energization of said non-directional sense antenna; a radio transmitting housing containing said loop antenna, said motor, said first means and said second means; said compass rose mounted at the top of said housing and disposed in a substantially horizontal plane; said sense antenna extendable outwardly from said housing.

References Cited in the file of this patent

UNITED STATES PATENTS

| | | |
|---|---|---|
| 2,468,109 | Richardson et al. | Apr. 26, 1949 |
| 2,502,447 | Frink | Apr. 4, 1950 |
| 2,710,960 | Norgorden et al. | June 14, 1955 |